United States Patent [19]

Friedman

[11] Patent Number: 4,674,632

[45] Date of Patent: Jun. 23, 1987

[54] SLIP CASE PACKAGE FOR BOOK AND COMPUTER SOFTWARE DISK

[75] Inventor: Herbert Friedman, Fort Lee, N.J.

[73] Assignee: Ivy Hill Corporation, New York, N.Y.

[21] Appl. No.: 756,789

[22] Filed: Jul. 18, 1985

[51] Int. Cl.$^4$ .......................... B65D 5/16; B65D 5/06
[52] U.S. Cl. .................................. 206/232; 206/211; 206/424; 206/444; 229/9
[58] Field of Search ............... 206/216, 232, 387, 424, 206/444, 449; 229/9

[56] References Cited

U.S. PATENT DOCUMENTS

| | | | |
|---|---|---|---|
| 2,384,633 | 9/1945 | Markowski | 206/309 |
| 2,580,141 | 9/1949 | Vidal | 206/232 |
| 3,023,010 | 2/1962 | Hoshina et al. | 206/454 |
| 3,773,251 | 11/1973 | Hadick | 206/232 |
| 3,829,132 | 8/1974 | Willieme | 281/31 |
| 4,004,689 | 1/1977 | Glasell | 206/387 |
| 4,290,524 | 9/1981 | Azar | 206/232 |
| 4,349,107 | 9/1982 | Pritchard | 206/449 |
| 4,511,034 | 4/1985 | Pan | 206/444 |
| 4,518,275 | 5/1985 | Rauch, III et al. | 206/387 |

FOREIGN PATENT DOCUMENTS

| | | | |
|---|---|---|---|
| 2451347 | 5/1976 | Fed. Rep. of Germany | 206/232 |
| 350364 | 6/1931 | United Kingdom | 229/9 |
| 2137169 | 10/1984 | United Kingdom | 206/557 |
| 2141998 | 1/1985 | United Kingdom | 206/444 |

Primary Examiner—Stephen P. Garbe
Assistant Examiner—Brenda J. Ehrhardt
Attorney, Agent, or Firm—Amster, Rothstein & Ebenstein

[57] ABSTRACT

A slip case package is disclosed for holding a book and a computer disk. The package comprises a slip case having a pocket in the interior thereof which holds the disk and a space for the book. The pocket is formed by two panels of the slip case, one of which is in the interior of the slip case. This panel includes a section which is severable from the interior of the slip case to provide access to the disk. Severing the section is made relatively difficult by virtue of the size of the section, the limited space in the interior of the slip case and the location of an engageable structure by means of which the section is grasped for severing it. As a result, even though the book may be removed from the slip case and perused in a retail store by a prospective purchaser, removal of the disk is somewhat involved and requires actions which discourage theft as such actions may easily be observed by store personnel.

38 Claims, 17 Drawing Figures

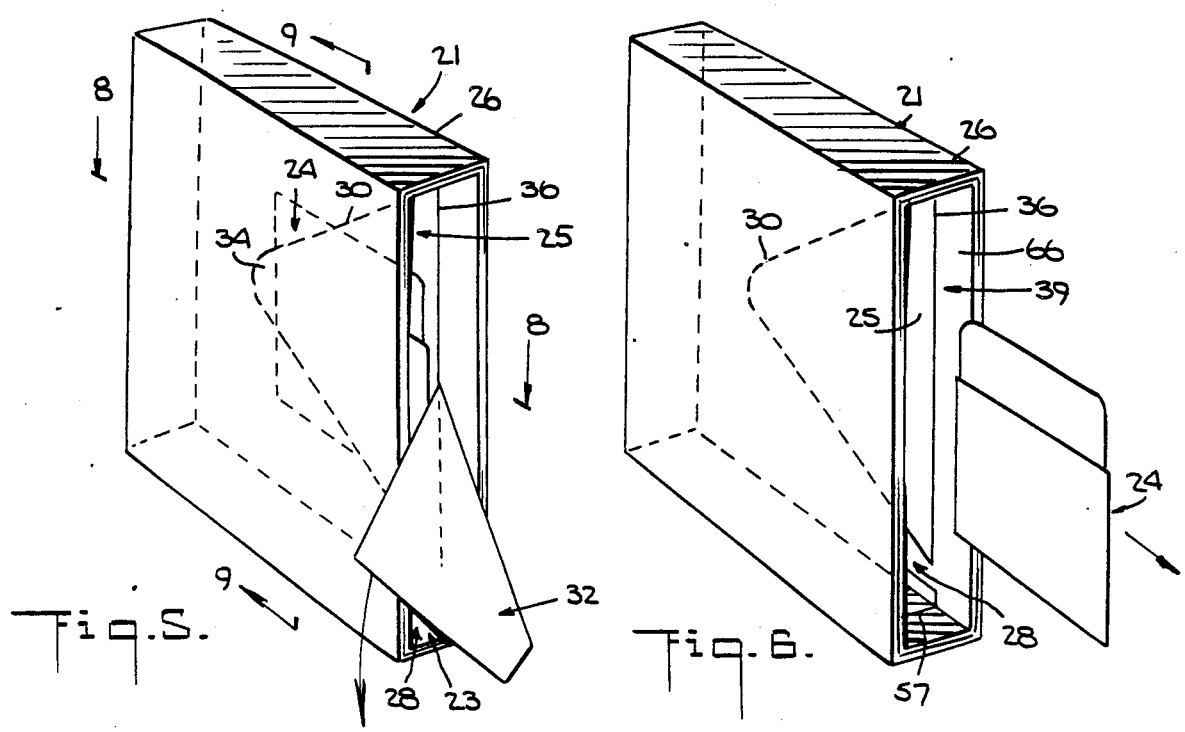
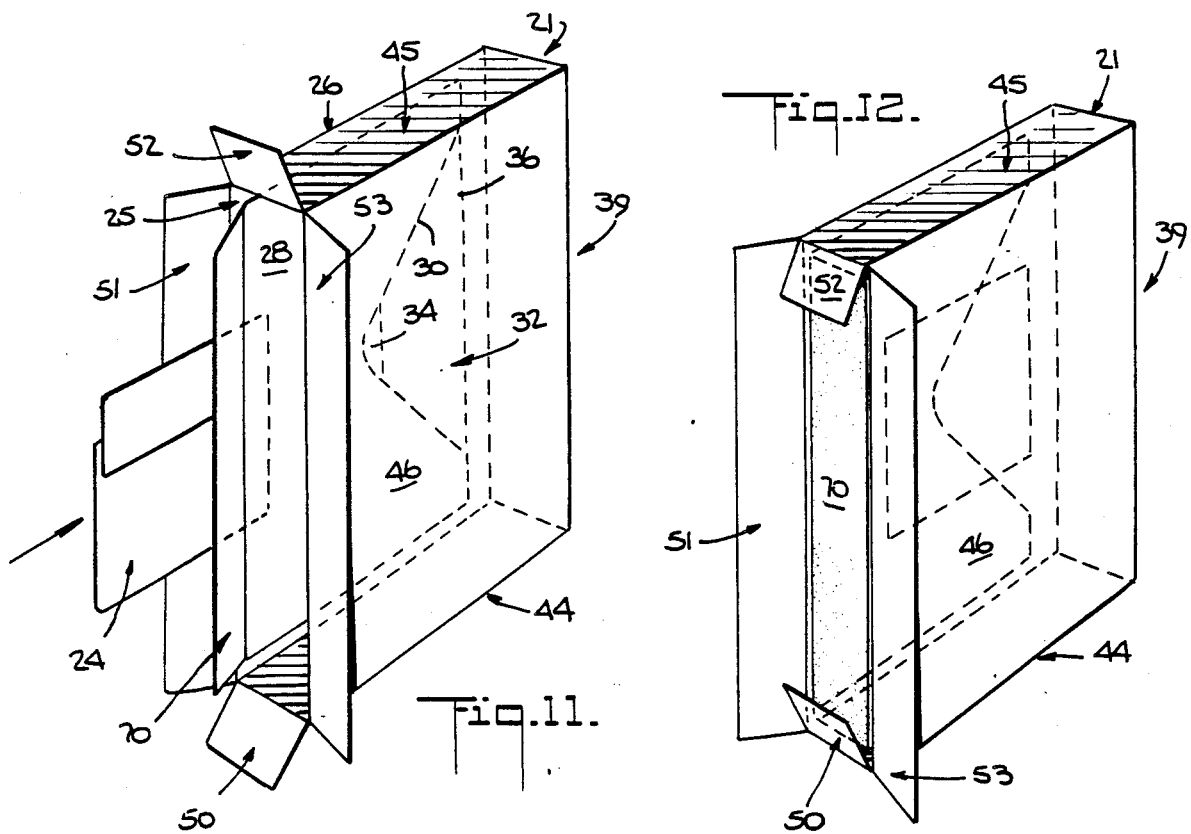

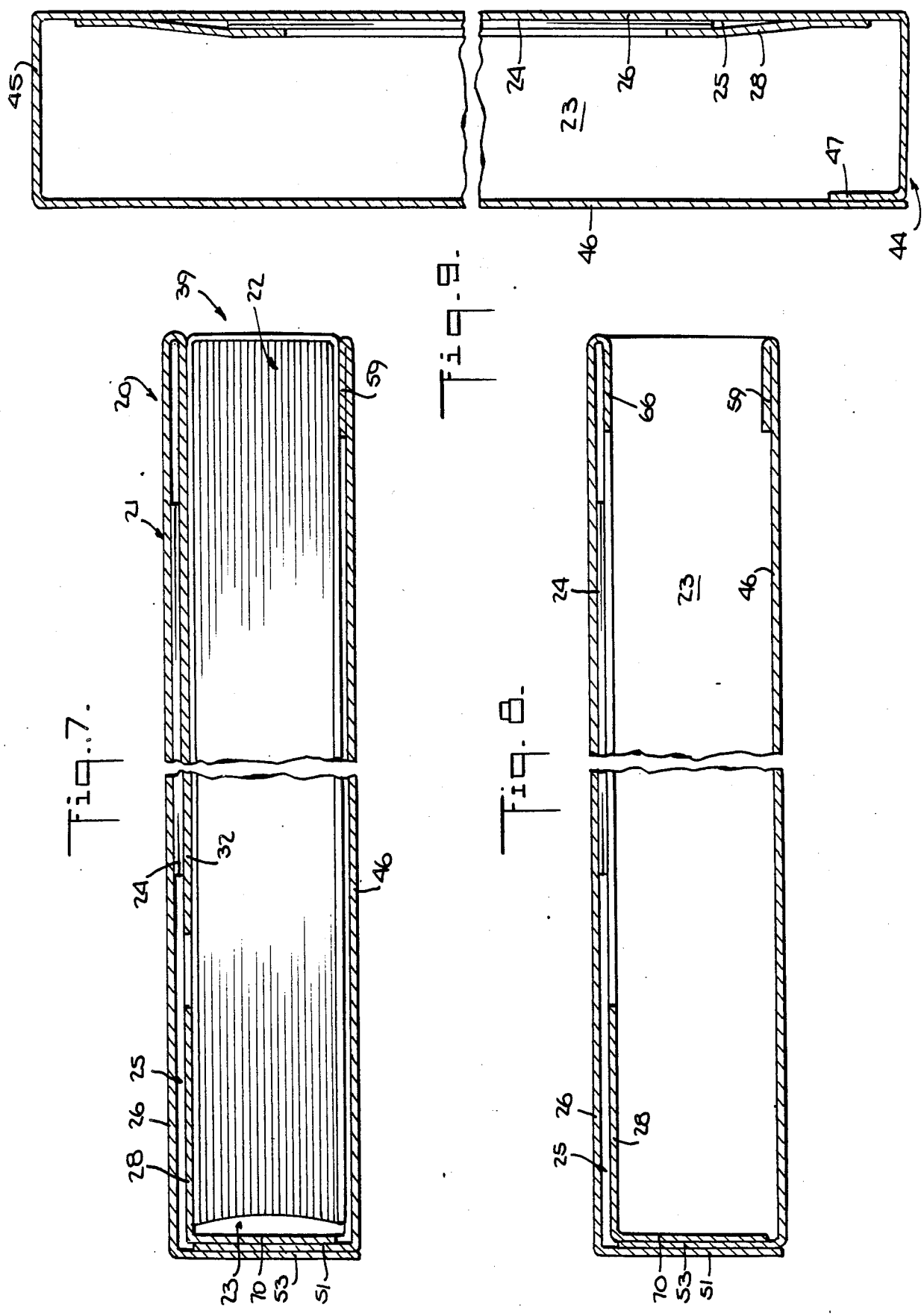

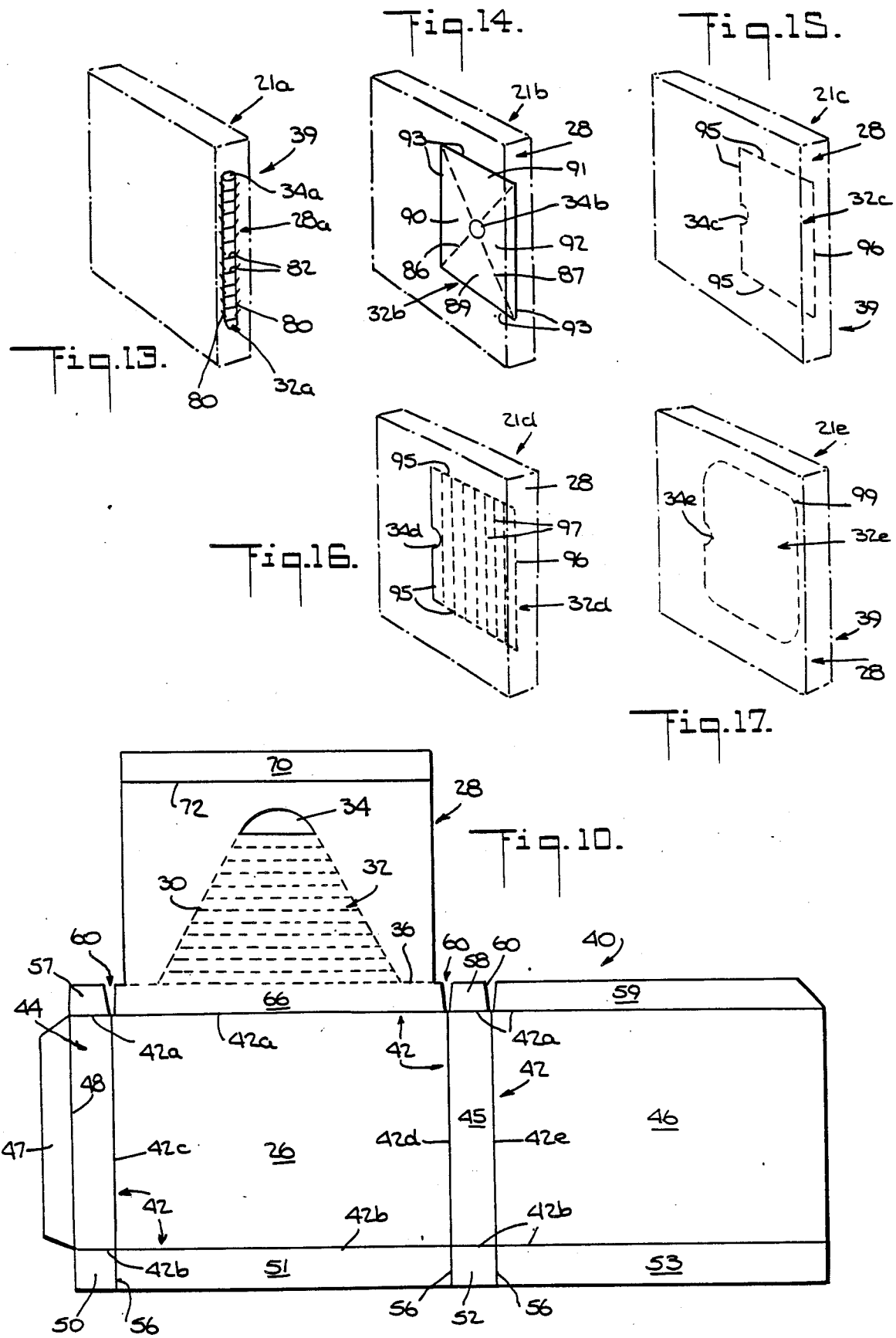

SLIP CASE PACKAGE FOR BOOK AND COMPUTER SOFTWARE DISK

BACKGROUND OF THE INVENTION

The invention disclosed herein relates to a slip case-type package suitable for holding sheet material, for example printed matter such as a book, and a recorded product, for example a disk containing, for example, a computer program, and/or audio and/or video programs, and to a slip case for holding the sheet material and recorded product, and to a blank from which the slip case is made.

In the specific case of a slip case package comprising a slip case for holding a book and a floppy disk, the book and disk can comprise a computer software package in which the book contains documentation such as instructional and explanatory material and the disk contains a magnetically-encoded computer program. To promote retail sale of such computer software, it is frequently desirable to make the computer software package "browsable", i.e., to permit prospective purchasers to examine the documentation to determine how useful the program may be. In a retail store environment, when a floppy disk is not protected, the danger exists that it will easily be stolen. Also, some computer software is sold on a contingency or conditional basis with the software being returnable as long as the purchaser has not had access to the program encoded on the disk.

While certain packages exist which contain both documentation and an encoded disk, none, so far as applicant is aware, are browsable and at the same time make separation of the disk from the package difficult in the context of a retail store environment so as to effectively prevent theft of the disk. For example, in one known type of package, a hinged vacuum-formed lid is provided having a pocket in each of the panels forming the lid. In this type of package, the documentation, i.e., a booklet, is disposed in the pocket in one of the panels and the disk is disposed in the pocket of the other panel. A sheet of clear plastic material is heat sealed over the disk. While the clear plastic material inhibits separation of the disk from the package, the plastic material can be relatively easily ruptured or torn away and the disk removed.

In another package which contains both documentation and an encoded disk, the disk is sealed in an envelope made, for example, of a highly tear-resistant material such as Tyvek non-woven polyolefin. The envelope is, in turn, either bound or fastened to the documentation. In order to separate the disk from the documentation, the envelope must be cut, which can be done relatively easily while the prospective purchaser holds and examines the documentation.

U.S. Pat. Nos. 2,580,141 (Vidal), 3,829,132 (Willieme), 4,004,689 (Glasell) and 4,290,524 (Azar) all disclose packages which contain a recorded product and sheet material. However, none of the packages disclosed in these patents appear to provide an effective solution to theft of the recorded product in a retail store environment.

OBJECTS AND SUMMARY OF THE INVENTION

It is an object of the present invention to provide a browsable software package particularly a slip case-type package, while safeguarding the encoded portion of the package from theft.

It is another object of the invention to prevent theft of a recorded product, for example a floppy disk, from a package, particularly a slip case-type package, containing the recorded product and sheet material.

It is another object of the invention to provide a slip case-type package containing sheet material and a recorded product, for example a floppy disk, which makes theft of the recorded product from the package difficult.

It is another object of the present invention to provide a one-piece blank from which a slip case for holding sheet material and a recorded product can be made in which theft of the recorded product is made difficult.

It is another object of the present invention to provide a slip case of the type described in the preceding object which can be manufactured on conventional folding carton equipment.

The above and other objects are achieved by the invention disclosed herein which provides a slip case-type package comprising a slip case having a first space for holding sheet material and a second space in the interior of the slip case defined by two panels thereof for holding the recorded product. One of the panels is an interior panel which is affixed in the slip case to retain the recorded product between the two panels and prevent easy removal of the recorded product. Thus, the package is browsable and at the same time safeguards the recorded product from theft.

In order to remove the recorded product, the sheet material must first be removed from the slip case, and then one must reach into the slip case, engage the interior panel and pull it into the interior of the slip case to at least partially sever the interior panel from the slip case, thereby exposing the recorded product for removal. The interior panel is provided with one or more weakened portions to facilitate partial or complete severing of the panel or of a section thereof. In a retail store environment, this operation for removing the recorded product requires actions which would conspicuously call attention to the prospective purchaser, thereby discouraging surreptitious theft of the recorded product.

The weakened portion or portions of the interior panel preferably define at least part of a section of the interior panel which can be at least partially severed from the interior panel to form an opening into the second space. This opening may have various shapes and sizes, for example, triangular, rectangular, circular, elliptical, combinations of these shapes, etc. Preferably, the opening is sized so that the portion of the interior panel remaining after severing of the section forms a pocket with the other of the two panels in which the recorded product can be retained after the section has been at least partially severed from the interior panel.

In the preferred embodiments, the slip case-type package is used to hold printed sheet material which may be permanently bound together in the form of a book or booklet and a magnetic disk, although the package can be used to house generally any sheet material and any generally flat product. The slip case of the package in the preferred embodiments is of rectangular prismatic shape and defines the first space in which printed sheet material can be housed, although the slip case may have other shapes. The slip case includes at least four exterior panels, a different one of four of the exterior panels forming substantially a different one of at least four exterior sides of the slip case. The interior panel is disposed in the interior of the package in a facing relationship with a first of the exterior panels and affixed so as to define the second space formed between the first exterior panel and the interior panel. The interior panel includes weakened portion or portions defining a section of the interior panel which facilitates at least partial severing of the section and the interior panel. The second space is exposed to the interior of the slip case and makes the disk accessible only after the section has at least been partially severed from the interior panel. The interior panel includes an engageable structure enabling the section to be engaged by, for example, one's finger from the interior of the slip case so that a force can be applied to at least partially sever the section and the interior panel. The first exterior panel and the interior panel are preferably affixed together at edge portions thereof.

The weakened portion or portions of the interior panel may, as indicated above, define at least part of a variety of configurations which when at least partially severed expose the disk to the interior of the slip case and enable its removal. For example, the weakened portion or portions may define at least part of the perimeter of a polygonal or closed curved figure which when the section is severed along at least part of the perimeter of the figure defines an opening into the second space having a shape corresponding generally to that of the figure. The weakened portion or portions may extend for less than the entire perimeter of the figure so that upon severing, the section remains bendably affixed to the interior panel. Alternatively, the weakened portion or portions can extend along the entire perimeter of the figure so that the partially severed section can be bent more easily or severed completely from the interior panel. As mentioned, preferably, the portions of the interior panel remaining after severing of the section define with the exterior panel a pocket for the disk.

In one specific embodiment, the weakened portion or portions define at least two sides of a generally triangularly-shaped section which, when severed along these at least two sides, defines a generally triangularly shaped opening into the second space between the first exterior and the interior panels. The triangularly-shaped opening is sized so that the portion of the interior panel from which the section was at least partially severed forms with the exterior panel a pocket suitable for retaining the disk and from which the disk can easily be removed and replaced. The weakened portion or portions may extend for less than the entire perimeter of the triangularly-shaped section (e.g., along only two sides) so that upon partially severing the section from the interior panel, the section remains bendably affixed to the interior panel. Alternatively, the weakened portion or portions can define the entire perimeter of the triangularly-shaped section so that the partially severed section can be bent more easily or severed completely from the interior panel.

In other specific embodiments, the weakened portion or portions define a generally rectangularly-shaped section, or a generally elliptically shaped section.

In still another specific embodiment, the weakened portion or portions define at least two intersecting lines dividing the section into two or more parts at least partially severable with respect to the section (and interior panel) and with respect to each other so that the section may be severed into two or more parts of the interior panel may remain affixed to the interior panel.

However, weakened portions can be provided so as to completely sever these parts from the panel or make bending of them easier. The severable parts of the panel, whether these panel parts are partially or completely severable, form a pocket which retains the recorded product.

The section in the interior panel may include a further one or more weakened portions which facilitate bending or rolling of the section relative to itself, or severing of the section relative to itself, as the section is being severed from the interior panel or after the section has been partially severed from the interior panel.

The weakened portion or portions described above preferably include perforations where the section or panel is to be severed, and perforations and/or scoring where the section or panel is to be bent.

The engageable structure according to the preferred embodiments comprises an opening in the interior panel positioned to enable one's finger to be inserted into the opening so that the section can be engaged and a force applied thereto for severing it. Alternatively, the engageable structure may comprise a tab, ring or other structure which can be engaged from the purpose of severing the section from the interior panel.

According to the preferred embodiments of the invention, the slip case of the package is made from an integral, unitary, one-piece, sheet-like blank. In the preferred embodiments, the blank is manufactured on conventional folding carton equipment by printing, die cutting, folding and gluing and is initially partially erected into a folded and glued configuration which allows it to be shipped flat to another location where the disk and/or printed material is assembled into the slip case, and the slip case glued into a rigid, non-foldable, self-supporting structure.

The sheet-like blank includes first weakened portions which facilitate bending of the blank and which are disposed to define a plurality of panels. The blank is configured and the first weakened portions disposed so that the blank is foldable at the first weakened portions into a structure defining the first space for the printed material. The blank also includes one or more second weakened portions which facilitate bending of the blank and which define a further panel (the interior panel) foldable at at least one of the second weakened portions into a facing relationship with a first (the first exterior panel) of the plurality of the panels. The further panel includes or more third weakened portions defining at least part of a section of the further panel for facilitating at least partial severing of the section from the further panel. In an embodiment in which the slip case of the package is of a rectangular prismatic shape, the first weakened portions define at least four panels (in addition to the further panel), and the first weakened portions are disposed and the blank is configured so that blank is foldable into an enclosure having at least four sides which define a rectangular prismatic first space, with each of four of the sides of tne enclosure being formed substantially by a different one of four of the panels. For a rectangular prismatic slip case having five closed sides and an open side or entrance, the first weakened portions define at least five panels (in addition to the further panel), and each of five of the sides are formed substantially by a different one of five of the panels. The further panel includes the engageable structure described above enabling the section to be engaged so that a force can be applied to at least partially sever the section and the further panel in the finally assembled condition of the slip case with the recorded product. The weakened portions of the blank may include scoring and/or perforations.

The above and other object, aspects, features and advantages of the invention will be more readily perceived from the description of the preferred embodiment thereof taken with the accompanying drawings and appended claims.

BRIEF DESCRIPTION OF THE DRAWINGS

The invention is illustrated by way of example and not limitation in the figures of the accompanying drawings in which like references indicate like parts, and in which:

FIG. 5 is a view similar to FIG. 4 illustrating the partially severed section being completely severed;

FIG. 6 is a front perspective view of the slip case of FIG. 5 with the book, the severed section and the floppy disk removed, illustrating removal of the floppy disk from the slip case;

FIG. 7 is a cross-sectional view of the slip case package of FIG. 1 taken along line 7—7 of FIG. 1;

FIG. 8 is a cross-sectional view of the slip case of FIG. 5 with the book removed and the severed section removed taken along line 8—8 of FIG. 5;

FIG. 9 is a cross-sectional view of the slip case of FIG. 5 with the book removed and the severed section removed taken along line 9—9 of FIG. 5;

FIG. 10 is a top plan view of a one-piece blank used to fabricate the slip case of FIG. 5;

FIG. 11 is a rear perspective view of the slip case of FIG. 1 partially erected from the blank of FIG. 10 showing the manner in which the floppy disk is inserted into the slip case;

FIG. 12 is a rear perspective view of the slip case of FIG. 1 partially erected with the floppy disk inserted into the slip case, illustrating closing of the rear of the slip case; and FIGS. 13-17 are front perspective views of slip cases showing alternate embodiments of the severable section.

DESCRIPTION OF THE PREFERRED EMBODIMENTS

Figure 1:
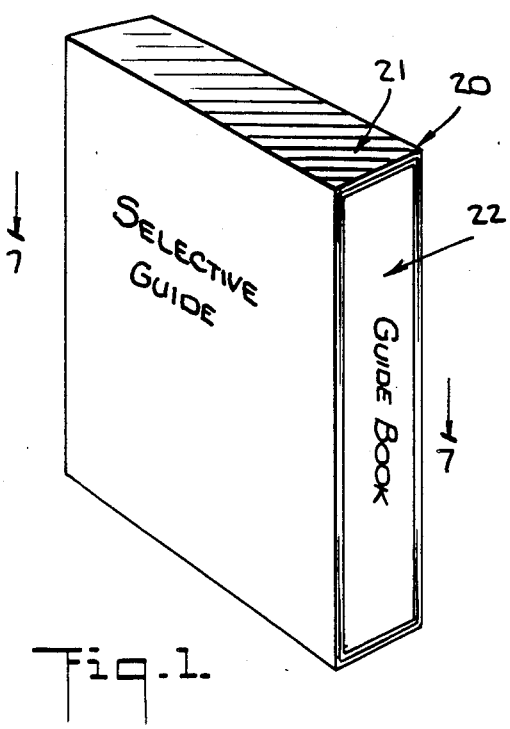
FIG. 1 is a front perspective view of a slip case package according to the invention including a slip case, book and a floppy disk (not shown) disposed in the slip case.
Figure 2:
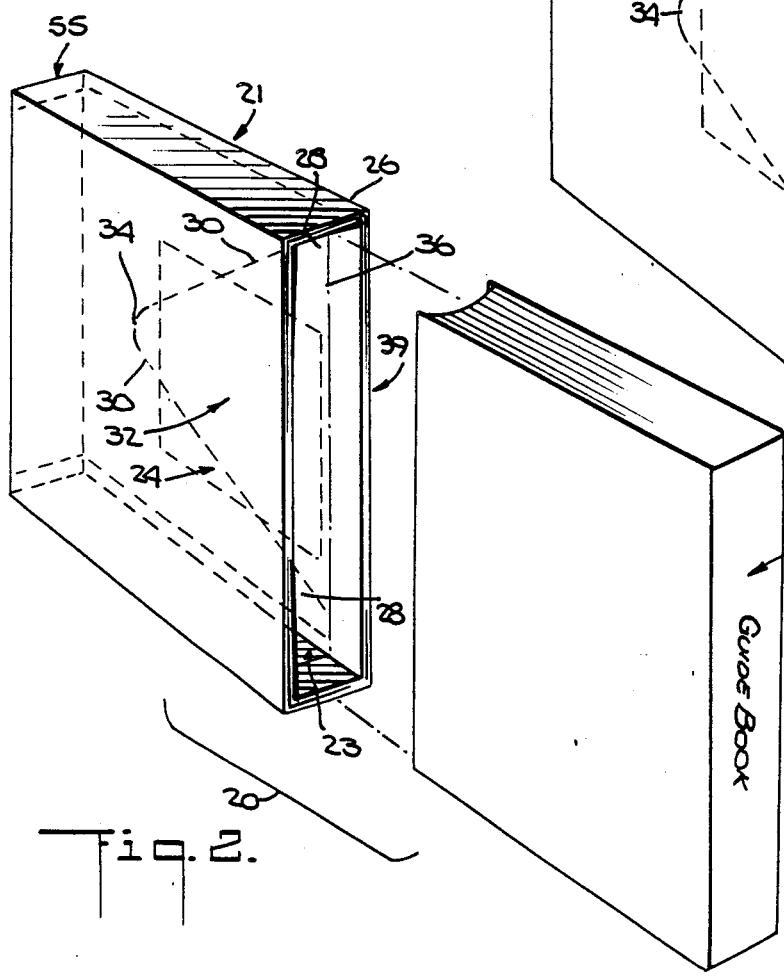
FIG. 2 is an exploded front perspective view of the slip case package of FIG. 1 showing the book removed from the slip case and the disposition of the floppy disk in the slip case.

As illustrated in FIG. 1, the slip case package 20 according to the invention which comprises a slip case 21 having a book 22 inserted therein appears from the outside to be quite similar to conventional slip cases. If desired, the slip case 21 can be wrapped in clear plastic. Referring to FIG. 2, in which the book 22 is removed from the slip case 21 leaving a first space 23, and to FIG. 7, a floppy disk 24 shown in phantom in FIG. 2 is secured in the slip case in a second space 25 (see FIGS. 7-9) between a first exterior panel 26 of the slip case and a further or interior panel 28 which are attached together. The floppy disk 24 as a result cannot simply be removed from the slip case after the book 22 has been removed and accordingly makes theft of the floppy disk difficult in a retail store environment while a prospective customer is examining the book.

Figure 3:
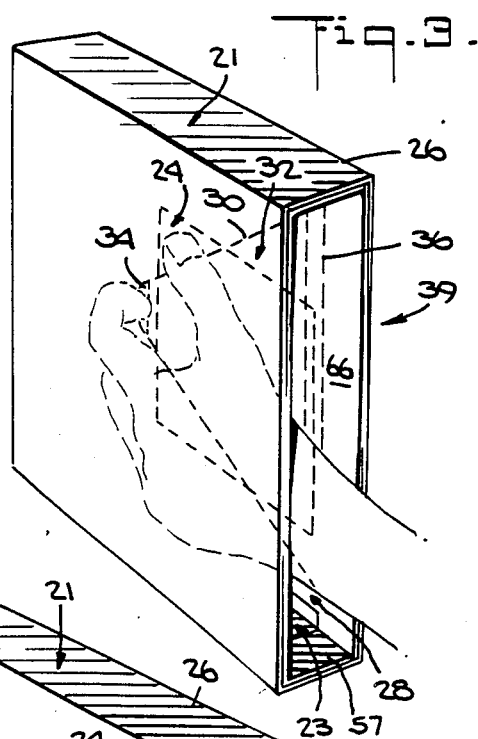
FIG. 3 is a front perspective view of the slip case of FIG. 1 with the book removed illustrating the manner in which a section of the slip case is grasped in order to initiate removal of the floppy disk therefrom.
Figure 4:
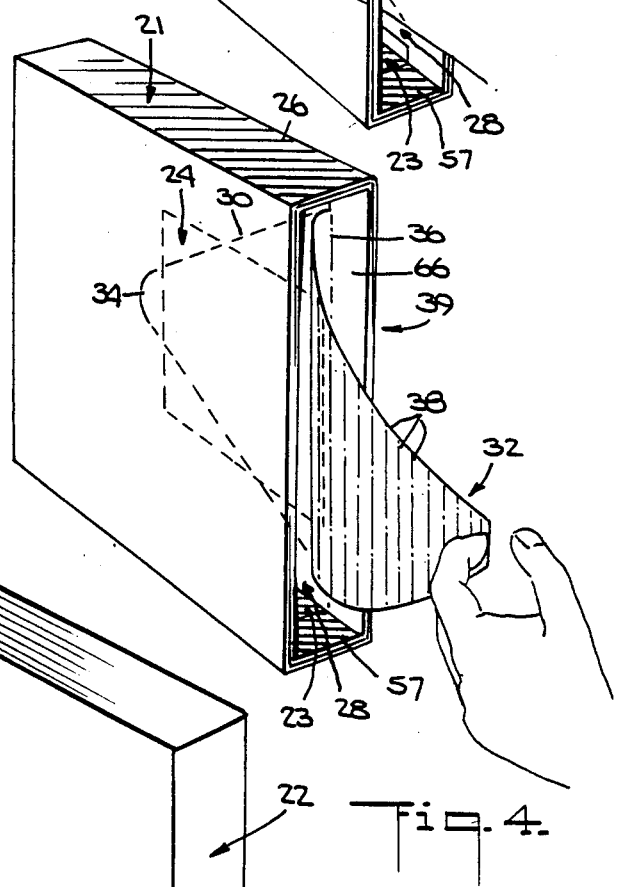
FIG. 4 is a view similar to FIG. 3 showing the grasped section partially severed to expose the floppy disk to the interior of the slip case.

The interior panel 28 includes weakened portions 30, embodied in FIG. 1 by perforations, in an area overlying the floppy disk 24 so as to define part of an at least partially severable section 32. The perforations 30 define two sides of a generally triangularly-shaped section 32. However, the perforations 30 can define other figures as shown for example in FIGS. 13-17. An opening 34 is provided in the interior panel 28 at a vertex formed by the perforations 30. This opening 34 defines engageable structure adjacent the vertex which enables the section 32 to be grasped by a finger, as illustrated in FIGS. 3 and 4. To remove the floppy disk 24 from the slip case 21, the section 32 is grasped as shown in FIG. 3, and a severing force is applied in a direction away from the interior panel 28 to partially sever the section 32 from the panel 28 along the perforations 30 and expose the second space 25 and the floppy disk 34 as illustrated in FIGS. 4 and 8-9.

The interior panel 28 includes a weakened portion 36, embodied in FIGS. 2-4 by perforations, which with perforations 30, define the three sides of the triangular section 32. Weakened portion 36 may include scoring in place of or in addition to the perforations. The weakened portion 36 facilitates bending of the section 32 away from the interior panel as shown in FIG. 4. When weakened portion 36 is embodied by perforations, the section 32 can be severed from the interior panel 28 along the perforations 36 as shown in FIG. 5. In either case, the remaining portion of the interior panel 28 forms with the exterior panel 26 a pocket (second space 25) for the disk 24. To accomplish this, the weakened portions are disposed so as to leave enough of the interior panel 28 unsevered to hold the disk between the interior and exterior panels after severing section 32.

The section 32 includes further weakened portions 38, also embodied in FIG. 4 by perforations, which facilitate bending, rolling or severing of the section 32 within the relatively confined first space 23 contained in the interior of the slip case 21 as the section 32 is being severed from the interior panel 28. Weakened portions 38 may include scoring in place of or in addition to the perforations.

The opening 34 in interior panel 28 is disposed spaced from the entrance 39 of the slip case so that the section 32 must be severed along substantial parts of weakened portions 30 before the floppy disk 24 can be removed from the slip case 21. This prevents a prospective purchaser from simply severing section 32 adjacent the entrance 39 which would permit easier removal of the floppy disk 24.

Referring now to FIG. 10, a one-piece cardboard blank 40 is depicted from which the slip case 21 is fabricated. Materials other than cardboard may also be used, for example other types of paperboard, plastic materials, etc. The blank 40, which is made from a unitary, integral sheet of material by die cutting, includes first weakened portions referred generally by 42 which are embodied in FIG. 10 by scoring. The scoring 42 extends to form four main exterior panels 44, 26, 45, and 46, and the further or interior panel 28. Main panel 44 includes a section 47 defined by a weakened portion 48 embodied in FIG. 10 by scoring which facilitates bending of section 47 so that it can be overlayed the edge portion of panel 46 and adhered thereto when the blank is erected into the slip case. When the blank 40 is assembled into the slip case 21, the four main exterior panels 44, 26, 45 and 46 define four sides of a rectangular prismatic enclosure forming first space 23, i.e., these four main panels form four exterior sides of the slip case 21. Scoring 42a-d facilitates folding of the blank 40 into the slip case 21. Scoring 42a facilitates folding of the further or interior panel 28 into a facing relationship with the first main exterior panel 26 to define a relatively narrow space 25 (FIG. 7) therebetween which can accommodate a relatively flat recorded product such as the floppy disk 24.

The blank 40 also includes flaps or panels 50, 51, 52 and 53 disposed adjacent main panels 44, 26, 45 and 46, respectively, with scoring 42b extending between respective main panels and flaps to facilitate folding of flaps 50-53 into a fifth side 55 of the slip case 21 (FIG. 2). Adjacent flaps 50-53 are slit at 56 to enable these flaps to be individually folded into the fifth end 55. The blank 40 further includes flaps or panels 57, 58 and 59 disposed adjacent main exterior panels 44, 45 and 46, respectively, with scoring 42a extending not only between panels 26 and 28 but also between flaps 57 and main panel 44, flap 58 and main panel 45, and flap 59 and main panel 46. Triangular slits 60 are provided adjacent flaps 57, 58 and 59 to enable these flaps to be individually bent. Scoring 42a facilitates folding of flaps 57, 58 and 59 into a facing relationship with main panels 44, 45 and 46, respectively, so that these flaps can be adhered to respective main panels, to make portions of the sides of the slip case 21 of double wall thickness to reinforce the main exterior panels adjacent the entrance 39 to the slip case 21. The further or interior panel 28 includes a flap 66 extending between scoring 42a and perforations 36 which is adhered to main panel 26 so that the portion of the side formed by main panel 26 adjacent the entrance 39 is also of double wall thickness and accordingly reinforced.

The embodiment of the interior panel 28 shown in FIG. 10 includes the generally triangularly-shaped section 32 and opening 34 described in connection with FIGS. 1-6. Panel 28 also includes a flap 70 disposed at the edge of the panel 28 opposite from flap 66 defined by a weakened portion 72, embodied in FIG. 10 by scoring, which facilitates folding of flap 70. Flap 70 is adhered to one or more of flaps 50-53 to close off the second space 25 for the disk and form part of the fifth side 55 of the slip case 21 (see FIG. 12).

Sheet material for blank 40 can be conventionally printed and die cut on conventional platen or rotary die cutters as are used to make folding cartons to form printed blanks. Printing of the sheet material from which the blank 40 is formed can be accomplished by letter press, lithography, gravure or flexography as well as other printing processes. Adhesive can be used to affix or adhere parts of the blank as described above and can be applied conventionally on right angle carton gluers as in adhering folding cartons.

The one-piece blank 40 (die cut and preprinted) is assembled into the slip case 21 as follows (not necessarily in the order described). A suitable adhesive or glue is applied to flaps 57, 66, 58 and 59 (and/or to portions of main panels 44, 26, 45 and 46 adjacent the respective flap). Adhesive is also applied to section 47 of main panel 44 (and/or to the free edge of main panel 46).

Adhesive is also applied to some or all of flaps 50-53 and flap 70, or parts thereof, so they can be adhered together and formed into the fifth side 55 of the slip case. The flaps 57, 58 and 59 are folded onto the main panels 44, 45 and 46 to adhere these flaps to the main panels, and the interior panel 28 is folded onto the exterior panel 26 and flap 66 adhered to panel 26. The blank is folded into a rectangular prismatic configuration and flap 47 adhered to the edge of panel 46. The slip case 21 now has the configuration depicted in FIG. 11 in which the flaps 50-53 and flap 70 are free and not as yet adhered to form the fifth side 55 of the slip case. As a result, the second space 23 between the interior panel 28 and the exterior panel 26 is accessible so that the floppy disk 24 can be inserted therein, as illustrated in FIG. 11. After the floppy disk 24 has been inserted into space 23 so that it underlies the section 32 of interior panel 28 as depicted in FIG. 12, the fifth side 55 of the slip case is formed by first folding the flap 70, as depicted in FIG. 12, followed by folding of the flaps 50 and 52, followed by folding of the flaps 53 and 51, with all or some of the contacting surfaces of flaps 50-53 and 70 being adhered together. The flaps 50-53 and 70 can be folded in other orders and printing on the flaps will take into consideration the order in which the flaps are to be folded.

In the partially assembled configuration of the slip case 21 depicted in FIG. 11, with the floppy disk 24 either not yet inserted or fully inserted, the slip case 21 may be folded flat so that it may be shipped flat to an assembly point where the slip case is fully erected and the book 22 and the floppy disk 24, if it was not inserted earlier, are assembled into the slip case.

Referring to FIGS. 13 through 17, alternate embodiments of slip cases are depicted in which the severable section has modified configurations. As in the embodiment of FIGS. 1-6, severing of the severable section from the interior panel in the embodiment of FIGS. 13-17 leaves enough of the interior panel to form a pocket for the disk. In the slip case 21 depicted in FIG. 13, the severable section 32a is in the form of a narrow strip defined by weakened portions 80 (perforations) disposed in the interior panel 28a adjacent the entrance 39. An opening 34a is disposed at one end of the strip 32a to enable the strip to be grasped and torn to provide an elongated opening through which the floppy disk can be removed. The elongated strip 32a preferably includes weakened portions 82 to enable it to be bent or rolled as it is being severed.

In the slip case 21b depicted in FIG. 14, weakened portions 86, 87 (perforations) define two approximately equally spaced intersecting lines. The intersecting lines 86-87 define four parts 89-92 of the section 32b, with parts of adjacent intersecting lines defining two sides of a triangle. An opening 34b is disposed at the intersection of the lines 86 and 87 to enable one's finger to be inserted therein for partially severing each of the parts 89-92 relative to the section 32b and to each other. A weakened portion 93 can be provided between each of the section parts 89-92 and the remainder of the interior panel 28 to facilitate bending of each part of section 32b and/or severing of an entire part or parts from the panel 28. In the embodiment of FIG. 14, when all parts 89-92 are bent or removed, a rectangularly-shaped opening is provided into the second space 25 in which the floppy disk is retained.

In the slip case 21c depicted in FIG. 15, weakened portions 95 (perforations) define three sides of a generally rectangular section 32c. Another weakened portion 96 (perforations) can be provided to define the fourth side of the section. An opening 34c is disposed at one of the sides of the section, preferably the side spaced more distantly from the entrance 39 to the slip case. Positioning the opening 34c away from the entrance to the slip case makes severing of the section 34c from the slip case more difficult.

In the slip case 21d depicted in FIG. 16, the section 32d is similar to section 32c and includes weakened portions 97 (perforations) which facilitate bending of section 32d as it is being severed from the interior panel.

In the slip case 21e depicted in FIG. 17, weakened portions 99 (perforations) define a generally rectangular or somewhat elliptical section 32e, and an opening 34e is disposed at a location of the perforations away from the entrance 39 to the slip case 21e. As in FIG. 16, the section 32e can be provided with weakened portions (not shown) to facilitate bending of the section 32e during severing.

Certain changes and modifications of the embodiments of the invention disclosed herein will be readily apparent to those skilled in the art. For example, the severable section may have shapes other than those specifically described herein and the weakened portions may be embodied by means other than perforations and/or scoring. In addition, parts of the severable section other than those specifically described herein may be bent, folded or severed. Also, the slip case itself may have configurations other than those specifically described herein. Moreover, the slip case may be fabricated in ways other than those specifically described herein and the blank itself can be made in ways other than those specifically described herein. As to the contents of the package, the slip case may be used to house many different types of sheet material and generally flat products. It is the applicant's intention to cover by the claims all such uses of the invention and all those changes and modifications which could be made to the embodiments of the invention herein chosen for the purpose of disclosure without departing from the spirit and scope of the invention.

What is claimed is:

1. A sheet-like blank for a slip case-type package, the blank having first weakened portions which facilitate bending of the blank and which are disposed to define at least four panels, the blank being configured so that the blank is foldable at the first weakened portions into a structure defining a substantially rectangular prismatic enclosure, the blank having one or more second weakened portions which also facilitate bending of the blank and which define a further panel disposed adjacent one of the four panels and foldable at at least one of the second weakened portions into a facing relationship with a first of the at least four panels, the further panel being of a size which is substantial in comparison to that of the first panel so as to be capable when folded into the facing relationship with the first panel of forming a pocket therewith of substantial size in comparison to the size of the first panel, the further panel including one or more third weakened portions in which the blank is at least partially cut through which define a section of the further panel and which facilitate at least partial severing of the section from the further panel.

2. The blank according to claim 1 wherein the first weakened portions are disposed and the blank is configured so that the blank is foldable into the structure defining the rectangular prismatic enclosure which has at least four sides each of which is formed substantially by a different one of four of the panels.

3. The blank according to claim 1 wherein the first weakened portions define at least five panels, the first weakened portions being disposed and the blank being configured so that the blank is foldable into the structure defining the rectangular prismatic enclosure which has at least five sides each of which is formed substantially by a different one of five of the panels.

4. The blank according to claim 1 wherein the further panel includes an engageable structure enabling the section of the further panel to be engaged so that a force can be applied to at least partially sever the section and the further panel.

5. The blank according to claim 4 wherein the engageable structure includes an opening in the further panel in or adjacent the section.

6. The blank according to claim 1 wherein the third weakened portion or portions define at least part of the perimeter of a closed figure.

7. The blank according to claim 6 wherein the third weakened portion or portions define at least part of the perimeter of at least one of a triangle, rectangle and ellipse.

8. The blank according to claim 1 wherein the third weakened portion or portions define at least two sides of a generally triangularly-shaped section.

9. The blank according to claim 8 wherein the further panel includes engageable means enabling the section to be engaged so that a force can be applied to at least partially sever the section and the further panel, the engageable means being disposed at the vertex formed by said at least two sides of the triangularly-shaped section.

10. The blank according to claim 1 wherein the third weakened portion or portions define at least three sides of a generally rectangularly-shaped section.

11. The blank according to claim 10 wherein the further panel includes engageable means enabling the section to be engaged so that a force can be applied to at least partially sever the section and the further panel, the engageable means being disposed adjacent one of said at least three sides of the rectangularly-shaped section.

12. The panel according to claim 1 wherein the third weakened portion or portions extend in at least two intersecting lines dividing the section into at least two parts, the two parts being at least partially severable relative to the further panel and to each other along the lines.

13. The blank according to claim 1 including fourth weakened portions in the section of the further panel for facilitating bending of the section relative to itself.

14. The blank according to claim 1 wherein the blank is an integral, one-piece unit.

15. A slip case made from the blank of claim 1.

16. A unitary, integral one-piece, sheet-like blank for a slip case, the blank including scoring defining at least four panels and a further panel, the scoring being disposed and the blank being configured so that the blank can be folded into a structure having at least four sides which define a rectangular prismatic enclosure, each of four of the sides being formed substantially by a different one of four of the at least four panels, the further panel being foldable at the scoring into a facing relationship with a first of the at least four panels, the further panel being of a size which is substantial in comparison to that of the first panel so as to be capable when folded into the facing relationship with the first panel of forming a pocket therewith of substantial size in comparison to the size of the first panel, the further panel including one or more weakened portions in which the blank is at least partially cut through which define a section of the further panel and which facilitate at least partial severing of the section from the further panel.

17. The blank according to claim 16 wherein the scoring defines at least five panels in addition to the further panel, the scoring being disposed and the blank being configured so that the blank is foldable into a structure having at least five sides which define the rectangular prismatic enclosure, each of five of the sides being formed substantially by a different one of five of the panels.

18. The blank according to claim 17 wherein the further panel includes an engageable structure enabling the section to be engaged so that a force can be applied to at least partially sever the section and the panel.

19. The blank according to claim 17 wherein the weakened portion or portions define at least two sides of a generally triangularly-shaped section.

20. The blank according to claim 19 wherein the further panel includes an opening at the vertex formed by the at least two sides of the triangularly-shaped section.

21. The blank according to claim 16 wherein the weakened portion or portions define at least three sides of a generally rectangularly-shaped section.

22. The blank according to claim 21 wherein the further panel includes an opening disposed at one of the at least three sides of the rectangularly-shaped section.

23. The blank according to claim 16 wherein the weakened portion or portions define at least two intersecting lines dividing the section into at least two parts, the further panel including an opening at the intersection of the lines, and the two parts being at least partially severable relative to the further panel and to each other along the lines.

24. The blank according to claim 16 wherein the section of the further panel includes at least one weakened portion to facilitate bending of the section relative to itself.

25. A slip case made from the blank of claim 17.

26. A slip case of generally rectangular prismatic configuration, the slip case including at least four panels, a different one of four of the panels forming substantially a different one of four of the sides of the slip case which sides form an enclosure defining a first space, the slip case including a further panel disposed in the interior of the slip case in a facing relationship with a first of the at least four panels, means affixing the further panel to the first panel so as to define a relatively narrow second space between the first and further panels in which a relatively flat product can be held, the further panel including a weakened portion or portions defining a section of the further panel and facilitating at least partial severing of the section and the further panel, the relatively narrow second space being exposed to the interior of the package when the section is at least partially severed from the further panel, the further panel including an engageable structure enabling the section to be engaged from the interior of the package so that a force can be applied to at least partially sever the section and the further panel.

27. The slip case according to claim 26 wherein the weakened portion or portions define at least two sides of a generally triangularly-shaped section, the further panel including an opening at the vertex formed by two sides of the triangularly-shaped section defining the engageable structure.

28. The slip case according to claim 26 wherein the weakened portion or portions define at least three sides of a generally rectangularly-shaped section, the further panel including an opening at one side of the at least three sides defining the engageable structure.

29. The slip case according to claim 26 wherein the weakened portion or portions define at least two intersecting lines dividing the section into at least two parts, the further panel including an opening at the intersection of the lines defining the engageable structure.

30. The slip case according to claim 26 wherein the section includes a further one or more weakened portions which facilitate bending of the section relative to itself.

31. The slip case according to claim 26 including a fifth panel forming substantially a fifth side of the slip case, the slip case having an entrance generally opposite the fifth side, the engageable means being disposed spaced from the entrance an appreciable distance so as to render at least partial severing of the section relatively difficult.

32. A slip case package comprising the combination of the slip case according to claim 26, sheet material disposed in the first space and a recorded product disposed in the relatively narrow second space.

33. The blank according to claim 1 wherein the one or more third weakened portions comprise perforations.

34. The blank according to claim 16 wherein the further one or more weakened portions comprise perforations.

35. The slip case according to claim 26 wherein the weakened portion or portions of the further panel comprise perforations.

36. The slip case according to claim 26 wherein the means affixing the further panel to the first panel include an adhesive applied to at least one of the first and further panels.

37. A sheet-like blank for a slip case-type package, the blank having first weakened portions which facilitate bending of the blank and which are disposed to define at least four substantially linearly extending panels, the blank being configured so that the blank is foldable at the first weakened portions into a structure defining a substantially rectangular prismatic enclosure having at least four sides each of which is formed substantially by a different one of the at least four panels, the blank having one or more second weakened portions which also facilitate bending of the blank and which define a further panel disposed adjacent one of the four panels extending substantially at a right angle with respect to the linearly extending panels, the further panel being foldable at at least one of the second weakened portions into a facing relationship with a first of the at least four panels and having a size so as to be capable of forming a pocket with the first panel of substantial size in comparison to the size of the first panel, the further panel including one or more third weakened portions defining a section of the further panel which facilitate at least partial severing of the section from the further panel.

38. A sheet-like blank for a slip case-type package and an adhesive applied thereto, the blank having first weakened portions which facilitate bending of the blank and which are disposed to define at least four adjacently disposed panels, the blank being configured so that the blank is foldable at the first weakened portions into a structure defining a substantially rectangular prismatic enclosure having at least four sides each of which is formed substantially by a different one of the at least four panels, the blank having at least one second weakened portion which also facilitates bending of the blank and which defines a further panel disposed adjacent a first of the four panels and having one end joined to the first panel at the at least one second weakened portion, the further panel having a free end opposite the one end, the further panel being foldable at the at least one second weakened portion onto the first of the at least four panels in a facing relationship therewith, the further panel having a size so as to be capable of forming a pocket with the first panel of substantial size in comparison to the size of the first panel, the blank having adhesive thereon in a location to adhere the free end of the further panel to the first panel when the further panel is folded thereon, the further panel including one or more third weakened portions defining a section of the further panel which facilitates at least partial severing of the section from the further panel.

* * * * *